Feb. 6, 1934.  J. VERDERBER  1,946,048
DRIVING-LOCKING MECHANISM
Filed Aug. 10, 1931
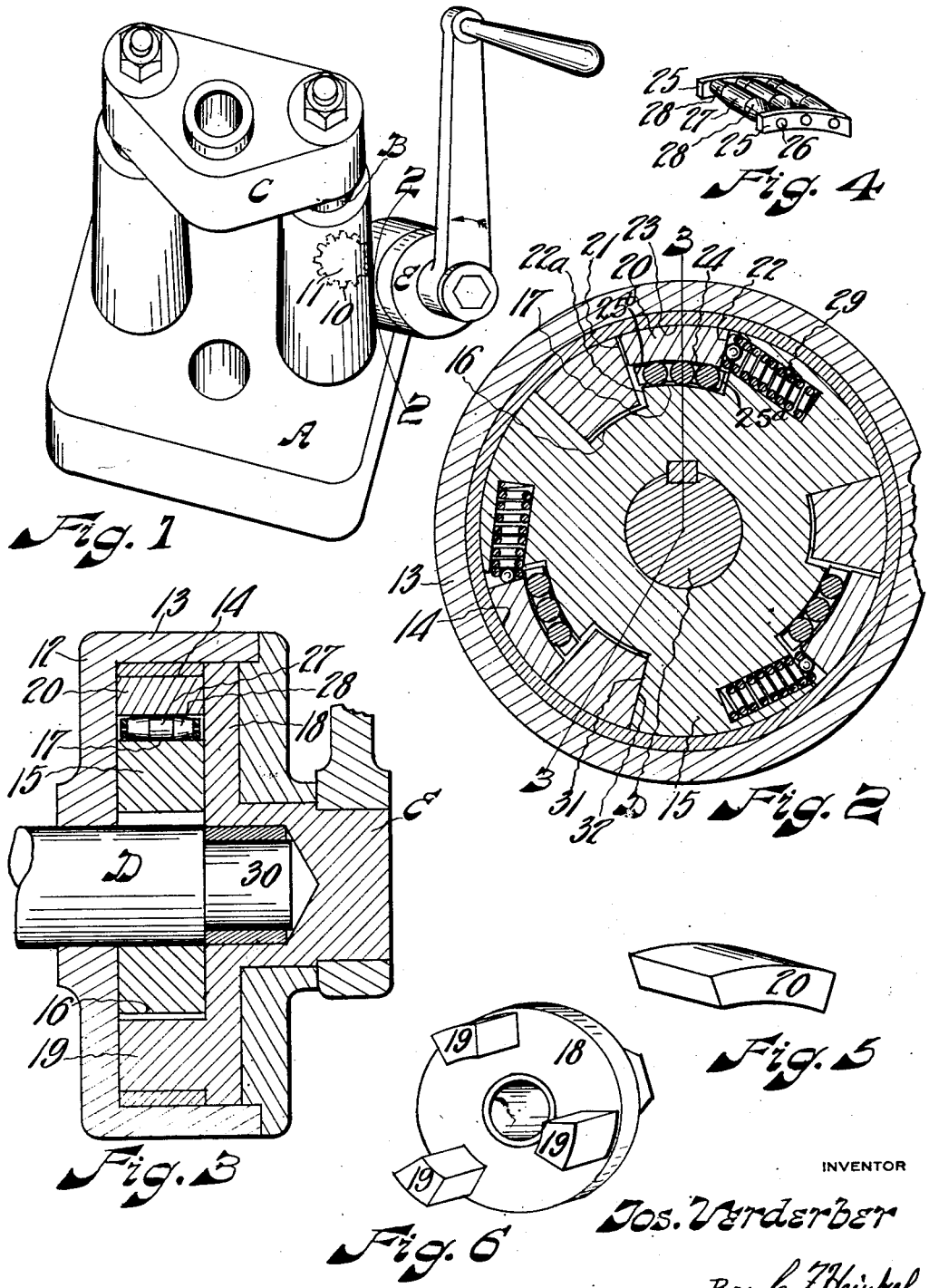
INVENTOR
Jos. Verderber
By C. F. Heinkel.
ATTORNEY Patented Feb. 6, 1934

1,946,048

UNITED STATES PATENT OFFICE 1,946,048

DRIVING-LOCKING MECHANISM

Joseph Verderber, Cleveland, Ohio, assignor to Cleveland Universal Jig Company, Cleveland, Ohio Application August 10, 1931. Serial No. 556,093

13 Claims. (Cl. 192—8)

My invention relates to mechanisms adapted to drive a mechanism and to lock the same against reverse movement.

Objects of my invention are:

To provide a mechanism with a combined driving and locking means;

To provide a releasable locking mechanism to prevent reverse movement of a driven member;

To provide easy operation for such a locking mechanism;

To provide means whereby the driving means for the driven member also effects the locking.

I attain my objects by the mechanism illustratively shown in the accompanying drawing in which:

Fig. 1 is a perspective view of a jig having a lock mechanism of my invention applied thereto.

Fig. 2 is a transverse section on a larger scale taken on the line 2—2 in Fig. 1.

Fig. 3 is a longitudinal section taken on the line 3—3 in Fig. 2.

Fig. 4 is a perspective view of the roller bearing cage.

Fig. 5 is a perspective view of the locking member.

Fig. 6 is a perspective view of the operating disk.

Similar reference characters refer to similar parts throughout the views.

The jig shown in the accompanying drawing has the base A, the two movable posts B guided therein and the work clamping plate C on the posts. The shaft D is journaled in the jig and has the gear teeth 10 meshing with similar teeth 11 on the posts so that rotation of the shaft moves the posts and the clamping plate for clamping and unclamping of work.

My invention resides in the driving-locking mechanism for the shaft.

The housing 12 may be integral with the base or may be a separate part secured thereto and has the annular part 13 in this instance with a lining therein provided with the bore 14 therein.

In the present instance, the disk 15 is secured to the shaft and has three notches 16 traversing the same in a direction parallel with the shaft and opening toward the bore 14. The outer circumference of the disk is journaled in the bore and the bottom 17 of the notches are arcuate and eccentric with the axis of the shaft and with the axis of the bore so that an inclination is formed between the wall of the bore and the bottoms of the notches.

In the present instance, the operating member or crank E has the flange portion 18 and three prongs 19 projecting therefrom and extending into the bore and into the corresponding one of the notches.

In the present instance, each one of the locking members 20 is loosely in one of the notches between the side 21 of the corresponding prong and the side wall 22 of the corresponding notch. The outer surface 23 of each locking member fits to the wall of the bore 14 and the inner surface 24 thereof is arcuate and parallel with the bottom 17 and consequently eccentric or inclined with the surface 23.

Each of the roller bearings is interposed radially between the corresponding bottom 17 and the corresponding inner surface 24 and circularly between the side 21 of the corresponding prong and the wall 22 of the corresponding notch.

Each of the side or companion plates 25 of each roller bearing cage extends beyond the rollers so that the rollers do not contact the sides 21 and 22. This extension of the plates also affords a means for adjusting the roller bearing cages by grinding off the ends of the plates when the rollers or the surfaces 17, 23 or 24 near so that a definite circular relation for proper locking can be maintained.

Each of the rollers has the journal part 26 on each end thereof journaled in the corresponding one of the plates. Each of the rollers also has the straight middle portion 27 and the tapered end portions 28 to provide some compensation for the rollers and for the parts associated with the rollers.

The rollers can be made straight all the way to provide more wearing surface for the rollers and for the surfaces contacted by the same if no compensation is required.

The springs 29 are mounted in the disk as shown and normally tend to retain the locking members in contact with the rollers and with the inner surface of the wall 14.

When the crank E, journaled on the end 30 of the shaft D, is rotatively moved in the direction of the arrow thereon, the sides 31 of the prongs contact the side walls 32 of the notches and thereby move the disk and the shaft rotatively and move the clamping plate toward the work to be clamped.

The springs 29 move with the disk and tend to keep the locking member in constant contact with the wall of the housing and the top of the rollers similar as shown in Fig. 2.

During a clamping operation of the device, there is a direct driving contact of the side 31 of the prong on the wall 32 of the notches.

When the clamping plate contacts the work there is a temporary interruption of the movement of the clamping plate and the rotation of the disk and the shaft. A further movement of the crank in the same direction takes up all lost motion and puts a strain or stress on the jig parts and in doing so, the disk rotates a little further and the side 22 contacts the end 25a of the roller bearing plates and moves the same up on the inclined or eccentric surface 17 while the spring 29 tends to move the locking member in the same direction. This movement causes the locking members to be wedged against the wall of the housing and to lock the disk and the shaft against self reversing to prevent self unclamping of the work. This locking operation can be carried to any desired degree by the final movement of the crank.

When the device is so locked, the roller bearings are moved forwardly of the position shown in Fig. 2 so that the end 25b thereof is close to the side 21 of the prong 19 and the forward side of the locking member is also close to the side 21 of the prong 19.

A reverse rotation of the crank first moves the prongs reversely so that the side 21 thereof contacts the end 25b of the bearings or the forward side of the locking member 20 and thereby moves either the bearing or the locking member backwards or down on the incline 17 and out of its locking position so that the work can be unclamped thereafter by the side 21 of the prong contacting the shoulder 22a of the disk.

As soon as the crank is again moved forwardly in the direction of the arrow the above described clamping and locking operation is repeated. When operation of the crank stops, the springs 29 wedge the locking members against the casing sufficiently tight to retain the clamping plate in any position in which it finds itself at the time.

If the clamping plate tends to unclamp the work, the shaft must rotate or tend to rotate and thereby rotate or tend to rotate the disk reversely. When such a tendency exists, the springs 29 tend to keep the locking members in locking position and the circumferentially higher part of the inclined surface 17 tends to wedge the locking members more tightly against the housing.

I am aware that changes and modifications can be made in the structure and arrangements of the parts shown and described within the spirit and intent of my invention and the appended claims; therefore, without limiting myself to the precise structure and arrangement of parts as shown and described.

I claim:

1. A locking mechanism including an annular housing, a disk journaled in said housing and having a notch therein opening toward the inner surface of the wall of said housing, the bottom of said notch eccentric with the axis of said disk, a locking member movable in said notch inwardly adjacent to said wall, an operating crank having a part extending into said notch, and a roller bearing in said notch radially between said bottom and said locking member and comprising sidewise spaced rollers and roller spacing plates on the longitudinal ends of said rollers and extending beyond the diameters of an end one of said rollers for contact thereon by said part.

2. A locking mechanism including an annular housing, a disk rotatable within said housing and having a notch therein opening toward the inner surface of the wall of said housing, the bottom of said notch eccentric with the axis of said disk and with said surface, a movable locking member in said notch inwardly adjacent to said surface, an operating crank having a part extending into said notch, and a plural roller bearing in said notch radially between said bottom and said locking member and circularly between said part and one of the side walls of said notch and having roller spacing plates on the ends thereof adapted to be contacted by said part and said side wall for locking and unlocking of said locking member.

3. A locking mechanism including an annular housing, a disk journaled in said housing and having a notch therein opening toward the inner surface of the wall of said housing, the bottom of said notch eccentric with the axis of said disk, a locking member movable in said notch inwardly adjacent to said surface, an operating crank having a part extending into said notch, and a roller bearing of positively sidewise spaced rollers in said notch radially between said bottom and said locking member; each end of each one of the rollers of said roller bearing is tapered so that said locking member rides only on the middle portions of the rollers and only the middle portion of the rollers ride on said bottom.

4. A wedging locking mechanism including a housing, a disk rotatable in said housing and having a notch therein opening toward the inner surface of the wall of said housing, the bottom of said notch being arcuate and eccentric with the axis of said disk and with the axis of said wall, a roller bearing of positively sidewise spaced rollers on said bottom, a locking member between said roller bearing and said surface; said locking member having a surface thereof parallel with said surface and another surface thereof parallel with said bottom, and an operating means to move said roller bearing and said locking member individually in said notch to temporarily wedgingly lock said disk against rotation in either direction in said housing.

5. A wedging locking mechanism including a housing, a disk rotatable in said housing and having a notch therein opening toward the inner surface of the wall of said housing, the bottom of said notch being arcuate and eccentric with the axis of said disk and with the axis of said surface, a crank having a prong extending into said notch, a roller bearing of positively sidewise spaced rollers on said bottom and circularly between said prong and one side of said notch, a locking member against said surface and circularly between said prong and said one side of the notch; said locking member having one side thereof parallel with said surface and the other side thereof parallel with said bottom and means operated by said crank to relatively move said roller bearing and said locking member in said notch to temporarily wedgingly lock said disk against rotation in either direction in said housing.

6. A locking mechanism including a movable locking member, walls confining the movement of said locking member, and a roller bearing supporting said locking member; said roller bearing comprising rollers journaled in companion plates and said plates extending longitudinally beyond the outside diameter of the end ones of said rollers.

7. A driving locking mechanism including a rotatable operating shaft, a disk on said shaft and having a notch with a shoulder therein, an operating crank journaled on said shaft and having a prong extending into said notch and adapted to engage one side wall of said notch and said shoulder therein for directly driving said shaft in either direction, a movable wedgingly locking mechanism in said notch circularly adjacent to said prong, and a roller bearing means operated by said crank to wedge said locking mechanism to temporarily lock said disk and shaft against rotation in either direction.

8. A jig including a work clamping means, a shaft to operate said clamping means, a crank to rotate said shaft for operating said clamping means, a movable locking member to lock said shaft against reverse rotation, a spring normally holding said locking member in locking position, and a roller bearing eccentrically supporting said locking member and comprising sidewise spaced rollers and roller spacing plates on the longitudinal ends of said rollers adapted to be contacted by a part of said crank to move said locking member out of its locking position to release said clamping means for unclamping thereof.

9. A jig including a work clamping means, a shaft to operate said clamping means, a crank to rotate said shaft journaled on said shaft and having a part engaging a part of said shaft to positively rotate said shaft in opposite directions, a movable locking member to lock said shaft against reverse rotation, a spring normally holding said locking member in locking position, and a roller bearing eccentrically supporting said locking member and comprising sidewise spaced rollers and roller spacing plates on the longitudinal ends of said rollers adapted to be contacted by said part of the crank to move said locking member into and out of its locking position upon corresponding movement of said crank.

10. A wedging locking mechanism including an individually movable locking member adapted to be wedged, means for normally retaining said locking member in a position for wedging, a unitary eccentrically mounted and individually movable roller bearing supporting said locking member, and means to move said roller bearing to wedge said locking member for locking thereby.

11. A wedging locking mechanism including a member movable relative to another member, a surface relatively inclined to form a recess between said members, a wedging element in said recess and comprising relatively movable parts each also movable in said recess, and an operating means to move the member with said recess and said parts for wedging and temporary locking of said movable member against movement in either direction in said other member.

12. A wedging locking mechanism including a member movable relative to another member, a surface on one of said members and inclined relative to a surface on the other one of said members, a roller bearing unit on said surface of said movable member, a movable locking member on said bearing unit, and means for moving said bearing unit and said locking member relatively and in relation to both of said surfaces to wedgingly lock said movable member against movement in either direction in said other member.

13. A wedging locking mechanism including a stationary member having a bore, a rotatable member in said bore, a surface on said rotatable member inclined to said bore, an individually movable locking member inwardly adjacent to said bore and opposite said surface, a unitary, eccentrically mounted and individually movable roller bearing between said surface and said locking member, and means to move said locking member and said roller bearing to wedge said locking member against said bore for locking thereby.

JOSEPH VERDERBER.